Patented Oct. 29, 1946

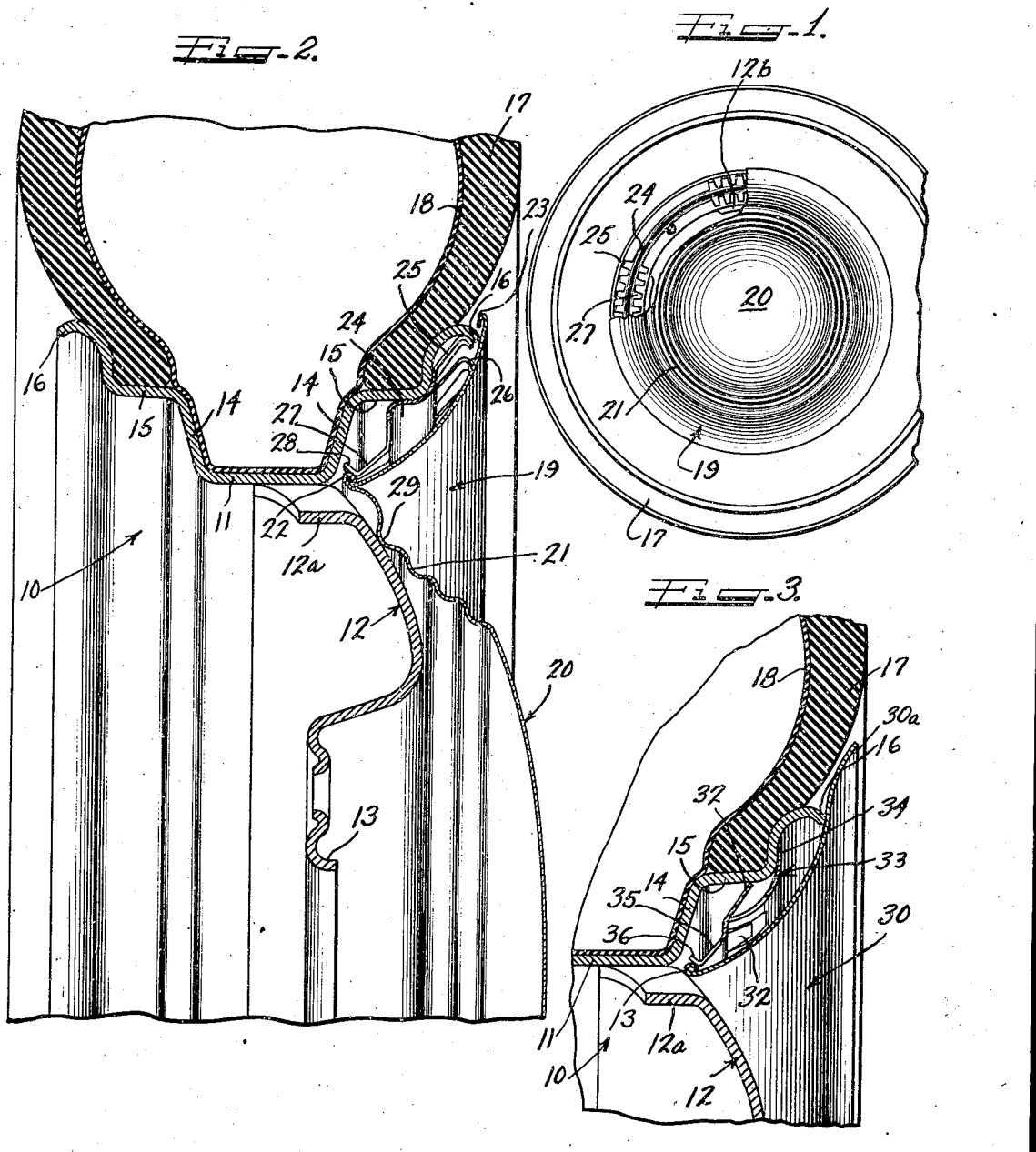

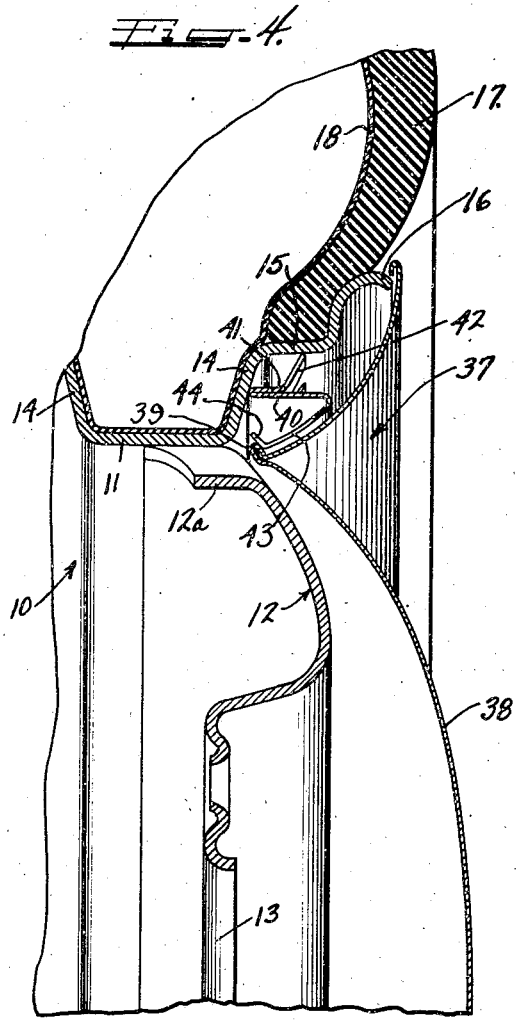

2,410,174

UNITED STATES PATENT OFFICE 2,410,174

WHEEL STRUCTURE

George Albert Lyon, Allenhurst, N. J.

Application June 2, 1943, Serial No. 489,312

5 Claims. (Cl. 301—37)

This invention is directed to an improved wheel assembly and relates more particularly to a novel cover assembly therefor.

It is an important object of the invention to provide an improved cover assembly and retaining structure therefor, whereby the cover assembly is efficiently secured over the outer side of the wheel to conceal the same.

Still another object of the invention is to provide an improved retaining means which may be efficiently utilized for retaining a cover member over the outer side of a wheel structure and from which the cover member may be readily and easily detached without requiring manipulation of the retaining means proper.

Another object of the invention is to provide for a wheel structure an improved cover assembly and improved retaining means for maintaining the same upon a wheel structure, the cover assembly including an outer annular part which may be constructed from sheet material having resiliently, locally flexible characteristics such as that of a synthetic plastic or the like, the annular cover portion preferably having a cross-sectional configuration of such shape and magnitude that it extends radially outwardly over the outer side of the tire rim of a wheel structure with which it is associated to conceal the same and to constitute, in effect, a continuation of the side wall of a tire in the tire rim to give the appearance of being a part thereof and to give the appearance of a white side wall of a massive tire mounted upon a wheel structure of minimum dimensions, when colored white.

Still another object of the invention is to provide for a self sustaining, form retaining, locally, resiliently, flexible cover member, novel retaining means which provides for resilient mounting of the cover, whereby local distortion or indentation of the cover at the point of attachment will be accommodated by resilient reaction of the retaining means and whereby the retaining means will serve as an instrumentality for forcing the cover member, so locally distorted, back into its normal configuration upon release of the distorting pressure.

In accordance with the general features of the invention there is provided herein, for a wheel structure, a cover assembly including a cover part having locally, resiliently flexible characteristics, and novel retaining means including resilient members for retainingly engaging an edge of the cover, said retaining means being resilient at the point of attachment with the cover member, whereby local distortion of the attached portion of the cover member will cause like deflection of the retaining means and whereby the latter acts to force the locally distorted cover member back into normal configuration after the distorting pressure has been released. In the present instance, this novel retaining means includes circumferentially spaced resilient fingers formed on an annular retaining member, the resilient fingers being adapted to be flexed by distortion of the cover member at the portion associated with the fingers, the fingers then forcing the cover back into normal configuration after distortion pressures have been removed.

Other objects and advantages of the invention will become apparent from the following description and accompanying drawings in which:

Figure 1 is a fragmentary side elevational view of a wheel construction embodying one form of the invention, parts being broken away for illustrative purposes;

Figure 2 is an enlarged fragmentary cross-sectional view of a wheel structure embodying the form of invention shown in Figure 1;

Figure 3 is an enlarged fragmentary cross-sectional view of a wheel structure embodying a further form of my invention; and Figure 4 is an enlarged fragmentary cross-sectional view of a wheel structure embodying still another form of the invention.

It will be understood that the embodiments shown herein are for illustrative purposes and may be changed or modified without departing from the spirit and scope of the invention as set forth in the appended claims.

As shown in Figure 2, there is provided herein a wheel structure including a tire rim 10, having a base flange 11 attached to a central load bearing portion or spider 12 as by riveting or welding, or the like, through a peripheral flange 12a on the load bearing portion, this flange being provided with circumferentially spaced radially inwardly depressed portions providing circumferentially spaced apertures 12b in the wheel structure. The central load bearing portion 12 is further provided with a bolt-on flange 13, while the tire rim is provided with opposite side flanges 14, opposite intermediate flanges 15 and opposite edge portions 16, between which is disposed a suitable pneumatic tire 17 having an inner tube 18.

As shown in Figure 1, the cover assembly constructed in accordance with my invention includes an outer annular part 19 and a central circular hub cap simulating part 20, the latter having a substantially axially inwardly extending corrugated skirt 21 terminating in a curled or beaded edge 22 arranged to envelop the inner peripheral marginal part of the cover portion 19 to afford a unitary cover assembly.

As will be seen from Figure 2 the junction between the cover parts 19 and 20 is arranged to provide a substantially axially inwardly extending rib 22 which may be utilized for retaining the cover assembly upon the wheel structure in a manner to be presently described.

The cover members 19 and 20 are formed from a sheet material having a degree of inherent resiliency, the cover portion 19 preferably being formed from a material such as a synthetic plastic or the like, whereby it possesses resiliently, elastically, locally flexible characteristics so that it may be locally deflected away from the tire rim to render the rear side thereof accessible for purposes of removal of the cover or to permit for servicing of the tire valve, wheel balancing weights or other appurtenances normally housed therebehind.

Furthermore, the cover member 19 is provided with a cross-sectional configuration of such shape and magnitude that it extends over the outer side of the tire rim to conceal the same and radially outwardly to or beyond the edge portion thereof with a gradual curvature similar to that of the side wall of the tire 17 whereby it constitutes, in effect, a continuation of the side wall of the tire to give the appearance of being a part thereof and to give the appearance of being a white side wall of a massive tire mounted upon a central load bearing wheel portion of minimum dimensions, when colored white. If desired the radially outer edge of the cover member 19 may be turned back to provide a circular curled portion for enhancing the appearance of the edge of the cover assembly.

To the end that the cover assembly above described may be securely retained in detachable engagement with the wheel structure there is provided herein a novel retaining element which includes an annulus having a cross-sectionally intermediate portion 24, cross-sectionally configurated to interfit with the curved junction between the edge portion 16 and the intermediate flange 15 of the tire rim 10.

The retaining member is further provided with circumferentially spaced groups of radially outwardly extending resilient fingers 25 having radially inwardly curled ends 26 which are arranged to fit resiliently within the radially inner surface of the axially extending lip of the edge portion 16 of the tire rim 10 and when in this position it will be seen that the retaining member is securely maintained in attached relationship with the wheel structure.

There is also provided on the intermediate portion 24 of the retaining member, substantially radially inwardly extending resilient fingers 27 terminating in obliquely disposed, radially outwardly, axially inwardly extending terminal portions 28, the latter portions being arranged to resiliently engage against the rib formed at the junction of the cover members 19 and 20 when the latter is urged axially inwardly relative thereto, thereby to retainingly secure the cover assembly to the retaining means and thus to the wheel structure. It will be understood that this retaining engagement between the fingers 27 and the cover assembly is obtained by virtue of the fact that the circle described by the junctions of the fingers 27 and the terminals 28 thereof is smaller than that described by the radially outer extremity of the bead at the junction of the cover parts 19 and 20. Therefore, when the cover assembly, and the bead 22 thereof, is urged axially inwardly relative to the retaining member the fingers 27 are urged radially outwardly, resiliently, until the bead 22 has passed the junction between the fingers 27 and the terminals 28 thereof, whereupon the fingers spring radially inwardly to provide the aforementioned attached relationship.

In assembling the construction above described and shown in Figure 2, it is merely necessary to dispose the retaining member concentrically over the outer side of the wheel structure and to press the same axially inwardly until the intermediate portion 24 thereof rests in nested relationship with the tire rim as shown. Upon such movement it will be seen that the ends 26 of the fingers 25 have been distorted radially inwardly resiliently to pass over the axially outermost extremity of the edge portion 16 of the tire rim and further have sprung resiliently, radially outwardly, into nested, retaining engagement with the radially inwardly turned lip of the edge portion to afford the desired attached relationship. Thereafter the assembled cover structure including the parts 19 and 20, and the axially inwardly extending rib formed at the junction thereof, may be pressed axially inwardly in concentric relationship with the wheel structure and the retaining means whereupon engagement between the rib 22 and the ends 28 of the fingers 27 is obtained. When the structure is so assembled it will be seen that the ends 28 of the radially inwardly extending fingers 27 are spaced from the adjacent side flange 14 and thus, since the fingers are resilient, there is provided a floating attachment for the cover assembly. With such a construction the cover assembly is maintained in concentricity with the wheel structure first by virtue of the engagement between the cover part 20 and the central load bearing portion 12, as shown at 29, and second by virtue of the concentric engagement thereof with the concentrically disposed retaining member.

In the construction shown in Figure 3, the cover structure comprises an annular member 30 which is provided with a shape generally similar to that described in connection with the construction of the member 19 of Figure 2 except that the member 30 extends radially outwardly beyond the junction between the edge portion 16 of the tire rim 10 and the side wall of the tire 17 to conceal said junction and to augment the appearance thereof as a part of the side wall of the tire. Furthermore, the cover 30 is flared outwardly as at 30a to present to the side wall of the tire 17 a smooth non-abrading, non-cutting surface thereby to protect the tire during rotation thereof under load bearing conditions. In this construction also the cover member is preferably formed from a material such as synthetic plastic or rubber, either natural or synthetic, having locally, resiliently, elastically flexible characteristics whereby the cover may be flexed outwardly away from the wheel structure to render the rear side thereof accessible and to accommodate the lateral expansion of the side wall of the tire 17 under load bearing conditions by breathing therewith. The cover member 30 of the construction shown in Figure 3 is further provided at the inner peripheral margin thereof with a rolled bead 31 which is available as a retaining element as will be described presently.

In the construction of Figure 3 the retaining means shown is generally similar to that described in connection with Figure 2 except that the radially outwardly extending fingers 32 thereof are struck from a body portion 33 and are provided with sharp ends whereby they are available to provide a biting engagement with the radially inner surface of the intermediate flange 15 when the retaining member is urged axially inwardly relative to the wheel structure a distance sufficient to bring the radially outer marginal portion 34 of the retaining member into face to face engagement with the radially innermost portion of the edge portion 16 of tire rim. In the retaining member shown in Figure 3 the radially inner peripheral part thereof is formed to provide radially inwardly extending, resilient fingers 35 terminating in obliquely disposed radially outwardly, axially inwardly, extending portions 36 which function in a manner similar to that explained in connection with the ends 28 of fingers 27 in the construction of Figure 2. In the present instance the bead 31 of the cover 30 is retainingly engaged by the end portions 36 of the fingers 35.

In the construction shown in Figure 4 the cover assembly, including cover parts 37 and 38, is generally similar to that shown in Figure 2 and described previously in conjunction therewith except that the central circular part 38 is not provided with the corrugations 21 of the construction shown in Figure 2. Thus, the ribbed junction 39 between the cover parts 37 and 38 is likewise utilized as the retaining instrumentality on the cover assembly.

In the construction of Figure 4 the annular retaining means comprises an annular intermediate portion 40 which has a part 41 bent back upon itself and terminating in obliquely disposed, radially outwardly, axially outwardly, extending sharp ended fingers 42 which are arranged to bitingly engage the radially inner surface of the adjacent intermediate flange 15 in the manner described in conjunction with the construction of Figure 3. The intermediate annular portion 40 of the retaining means is further provided at the radially inner edge thereof with resilient cover engaging fingers 43 which terminate in ends 44 which are constructed, and which function in a manner similar to ends 28 and 36 previously described in conjunction with the constructions of Figures 2 and 3.

In assembling the construction of Figure 4 the retaining member is disposed concentrically relative to the wheel structure and urged axially inwardly thereof a sufficient distance whereby the axially inner extremity of the intermediate part 40 abuts the outer surface of the adjacent side flange 14 in which position the ends of fingers 42 have been sprung radially inwardly to provide biting engagement with the radially inner surface of the adjacent intermediate flange 15. Thereafter the cover assembly is urged axially inwardly relative to the wheel structure until the axially inwardly extending rib 39 thereof passes beyond the junction of the resilient fingers 43 and the ends 44 thereof, whereupon the fingers spring radially inwardly to afford the retained engagement shown in the drawings.

Another important aspect of the present invention is the protection afforded by the retaining member for the outer portion of the cover which, as previously explained, is preferably formed from synthetic plastic, or the like, and is thus relatively weaker than metal or the like. This protection is desirable because of the locally flexible character of the outer cover part. This part, because of the foregoing characteristics, may be distorted by axial inward pressure imposed thereon at the part engaged by the radially inwardly extending elements of the retaining member. These elements however, being spaced from the adjacent portion of the outer surface of the wheel structure and being resilient, will flex upon the impression of such distorting pressure and, when the distorting pressure is removed, will serve to force the locally distorted part of the cover axially outwardly into its normal configuration. Thus the retaining member not only serves as a backing medium for the relatively weak cover but also serves to flex the cover into normal configuration after it has been distorted.

What I claim is:

1. In a wheel structure having a tire rim portion and a central load bearing portion, said tire rim portion having a generally axially outwardly protruding intermediate portion, a cover assembly including a self-sustaining resilient readily flexible part adapted for sharp localized flexing without permanent deformation and arranged to be flexed away from the wheel structure when associated therewith to allow access to the outer side of the wheel and permit removal of said cover part, and a retaining member to secure the cover on the outer side of the wheel structure including an annular part having a plurality of sets of resilient fingers extending therefrom in substantially opposite radial directions, one of said sets of fingers resiliently retainingly receiving a portion of the cover and another of said sets resiliently engaging the wheel structure to secure the retaining means thereto, a portion of the retaining member intermediate said sets of fingers engaging said protruding portion of the tire rim.

2. In a wheel structure including a tire rim and a central load bearing portion, said rim having cross-sectionally curvate portions at the outer surface thereof, a cover assembly for disposition over the outer side of the wheel structure including a self-sustaining resilient readily flexible part adapted for sharp localized flexing to allow access to the outer side of the wheel and permit removal of the cover when secured on the wheel, and retaining means for securing the cover assembly thereto, said retaining means including a portion cross-sectionally shaped to conform to the configuration of the cross-sectionally curvate portion of the rim and resilient means urging said shaped retaining means portion against said curvate portion for resilient wedging engagement of said retaining means on the wheel, and said retaining means also including resilient means spaced from the wheel structure for retaining engagement with the cover.

3. In a wheel structure having a tire rim portion and a central load bearing portion, a cover assembly for disposition over the outer side of the wheel structure including a resilient readily flexible self-sustaining part adapted for sharp localized flexing without permanent deformation and arranged for flexing away from the wheel structure when secured thereon to allow access to the outer side of the wheel and permit removal of said part, means for retaining the cover assembly over the wheel structure including an annular part shaped to conform to the configuration of the adjacent portion of the outer surface of the rim portion and substantially radially outwardly extending resilient fingers engaging the rim portion and resiliently urging said shaped part against said adjacent rim portion to secure said retaining means on the rim portion, and also including substantially radially inwardly extending resilient fingers for retainingly engaging a portion of the cover assembly.

4. In a cover structure for a wheel including flanged rim and body parts, certain of the flanges of the rim providing an intermediate generally axially outwardly protruding annular portion, a cover comprising an annulus for substantially concealing the outer side of the rim, and means for securing the cover in place comprising an annular retainer having substantially aligned oppositely extending resilient portions respectively engaging the tire rim and the cover, and a portion intermediate said resilient portions in surface engagement with said protruding annular portion of the rim.

5. In a cover structure for a wheel including flanged rim and body parts, certain of the flanges of the rim providing an intermediate generally axially outwardly protruding annular portion, a cover comprising an annulus for substantially concealing the outer side of the rim, and means for securing the cover in place comprising an annular retainer having substantially aligned oppositely extending resilient portions respectively engaging the tire rim and the cover, and a portion intermediate said resilient portions engaging said protruding annular portion of the rim, said intermediate portion of the retaining annulus being angularly related to said resilient portions and engaging said protruding portion of the rim in face-to-face relation.

GEORGE ALBERT LYON.